United States Patent [19]

Yamamoto et al.

[11] Patent Number: 4,687,890
[45] Date of Patent: Aug. 18, 1987

[54] GAS INSULATED SWITCHGEAR

[75] Inventors: Hiroshi Yamamoto; Hayato Suzuki; Keizo Takatsuka, all of Amagasaki, Japan

[73] Assignee: Mitsubishi Denki Kabushiki Kaisha, Tokyo, Japan

[21] Appl. No.: 877,864

[22] Filed: Jun. 24, 1986

[30] Foreign Application Priority Data

Jun. 25, 1985 [JP] Japan .................................. 60-136887

[51] Int. Cl.$^4$ ........................................... H01H 33/60
[52] U.S. Cl. ................................ 200/148 B; 200/148 R
[58] Field of Search ...................... 200/148 B, 148 R; 361/331, 335, 341

[56] References Cited

U.S. PATENT DOCUMENTS 3,614,355 10/1971 Boersma ........................... 200/148 B
4,417,111 11/1983 Kishi et al. ....................... 200/148 R
4,503,481 3/1985 Fujiya et al. ........................ 361/341

Primary Examiner—Robert S. Macon
Attorney, Agent, or Firm—Leydig, Voit & Mayer

[57] ABSTRACT

A bus bar connecting arrangement for a gas insulated switchgear designed to reduce the overall size thereof and the number of component parts, thereby decreasing the required installation space and trimming the production costs. The bus bar connecting arrangement comprises: a pair of first and second bus bars disposed in a spaced apart relation with each other; a first and a second disconnecting switch unit connected in the first and second bus bars, respectively; a circuit interrupter provided with a single opening and including at least one pair of movable and stationary contacts for opening and closing an electrical circuit connecting between the first and second bus bars; a current transformer unit adapted to be interposed between the first and second bus bars and the circuit interrupter and having at least one current transformer; first connecting conductors extending from the first bus bar into the circuit interrupter through the current transformer unit and the opening in the circuit interrupter for electrical connection between the first bus bar and the movable contact of the circuit interrupter; and second connecting conductors extending from the second bus bar into the circuit interrupter through the current transformer unit and the opening in the circuit interrupter for electrical connection between the second bus bar and the stationary contact of the circuit interrupter.

12 Claims, 5 Drawing Figures

GAS INSULATED SWITCHGEARF

BACKGROUND OF THE INVENTION

Field of the Invention

The present invention relates generally to a gas insulated switchgear, and more particularly, to a bus bar connecting arrangement for a gas insulated switchgear adapted for use with a power station. Description of the Prior Art An example of a convential bus bar connecting arrangement for a gas insulated switchgear is shown in FIGS. 4 and 5. In these FIGS., the bus bar connecting arrangement includes a circuit interrupter 1, a first and a second current transformer 2a and 2b, a first and a second disconnecting switch 3a and 3b, a first and a second bus bar 4a and 4b, and a first and a second connecting bus bar 5 and 6. The first and second bus bars 5 and 6 each have a part thereof integrally formed with the first and second disconnecting switches 3a and 3b, respectively.

In the conventional bus bar connecting arangement described above, the first and second current transformers 2a and 2b are disposed on the opposite sides of the circuit interrupter 1 in an aligned relation with each other, and the second bus bar 4b is disposed vertically apart from the first bus bar 4a and in a parallel relation therewith. As a result, a curent path extending from the first bus bar 4a in a horizontal direction passes through the first disconnecting switch 3a, the first current transformer 2a, the circuit interrupter 1 and the second current transformer 2b, and is connected with the second bus bar 4b through the first connecting bus bar 5 in the form of an inverted L-shaped cylinder and the horizontally disposed second connecting bus bar 6. The first connecting bus bar 5 is connected at its upper end with the second current transformer 2b and at its lower end with the second connecting bus bar 6 which is disposed in parallel relation with the circuit interrupter 1 and the first and second current transformers 2a and 2b.

Thus, as clearly shown in FIG. 4, the entire bus bar connecting arrangement is of a so-called turned-back construction which requires the two connecting bus bars. Accordingly, the overall width or lateral dimension D2 of the bus bar connecting arrangement (the width of the circuit interrupter 1 plus the width of the first connecting bus bar 5) is relatively large as compared with the width of the circuit interrupter 1 alone, so that a relatively wide space is required for installation of the circuit interrupter 1 and the connecting bus bar 5.

With the conventional bus bar connecting arrangement for a gas insulated switchgear, however, provision of the two connecting bus bars 5 and 6 increases the number of component parts as required and hence the cost of production. Moreover, the turned-back construction necessarily increases the width or lateral D2 dimension of the bus bar connecting arrangement, thus posing various problems from the economical and dimensional points of view.

Although in FIGS. 4 and 5, there is shown an example of a conventional bus bar connecting arrangement of the type in which the two bus bars 4a and 4b are vertically disposed one over the other, the above-mentioned problems are also involved in a case where the two bus bars 4a and 4b are horizontally disposed side by side.

SUMMARY OF THE INVENTION

In view of the above, the present invention is intended to obviate the above-described problems of the prior art, and has for its object the provision of a bus bar connecting arrangement for a gas insulated switchgear of the type described above in which the overall size and the number of component parts can be reduced, thus decreasing the installation space required and trimming the production costs.

In order to achieve the above object, according to the present invention, there is provided a bus bar connecting arrangement for a gas insulated switchgear which comprises: a pair of first and second bus bars disposed in a spaced apart relation with each other; a first and a second disconnecting switch unit connected in the first and second bus bars, respectively; a circuit interrupter provided with a single opening and including at least one pair of movable and stationary contacts for opening and closing an electrical circuit connecting between the first and second bus bars; a current transformer unit adapted to be interposed between the first and second bus bars and the circuit interrupter and having at least one current transformer; first connecting conductor means extending from the first bus bar into the circuit interrupter through the current transformer unit and the opening in the circuit interrupter for electrical connection between the first bus bar and the movable contact of the circuit interrupter; and second connecting conductor means extending from the second bus bar into the circuit interrupter through the current transformer unit and the opening in the circuit interrupter for electrical connection between the second bus bar and the stationary contact of the circuit interrupter.

In one embodiment, the first and second bus bars are vertically disposed one over the other. The current transformer unit includes a hollow cylindrical housing having at least one pair of first and second current transformers received therein, the hollow cylindrical housing being directly connected at its one end with the first disconnecting switch unit and at its other end with the opening in the circuit interrupter. The hollow cylindrical housing is provided at its side wall with an opening which is connected through a connecting bus bar with the second disconnecting switch unit.

In another embodiment, the first and second bus bars are horizontally disposed in two rows. The current transformer unit includes a Y-shaped hollow cylindrical housing which is directly connected at its bifurcate ends with the first and second disconnecting switch units, respectively, and at its other end with the opening in the circuit interrupter.

In a further embodiment, the first and second bus bars are obliquely disposed in a vertically and horizontally spaced apart relation with each other. The current transformer unit includes a Y-shaped hollow cylindrical housing which is directly connected at its bifurcate ends with the first and second disconnecting switch units, respectively, and at its other end with the opening in the circuit interrupter.

In a preferred embodiment, the current transformer unit has a single housing in which at least one pair of first and second current transformers are accommodated, and the transformer housing has three openings formed therethrough and is connected at one of said three openings with the first disconnecting switch unit, at another opening thereof with the second disconnecting switch unit, and at the last opening thereof with the circuit interrupter.

Alternatively, the current transformer unit includes at least two separate housings in one of which the first current transformer is housed, and in the other of which the second current transformer is housed.

The first and second bus bars may each have a plurality of conductors; the first and second disconnecting switch units each have the corresponding number of first and second disconnecting switches, respectively; the circuit interrupter includes the corresponding number of movable and stationary contacts; the current transformer unit includes the corresponding number of first and second current transformers; and the first and second connecting conductor means each comprise the corresponding number of connecting conductors each electrically connecting one of the first bus bar conductors with the associated one of the second bus bar conductors.

Preferably, a barrier is provided between the first and second connecting conductor means for providing electrical insulation therebetween.

The above and other objects, features and advantages of the present invention will become apparent from the following detailed description of a presently preferred embodiment of the invention when taken in conjunction with the accompanying drawings.

DESCRIPTION OF THE PREFERRED EMBODIMENT

Now, the present invention will be described in detail with reference to a preferred embodiment thereof illustrated in FIGS. 1 through 3 of the accompanying drawings.

Figure 1:
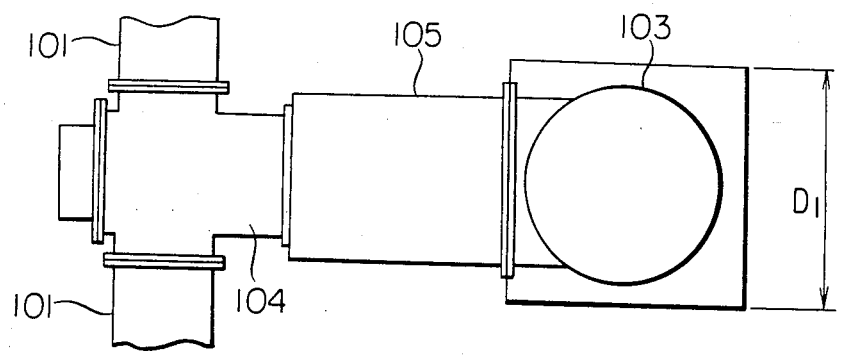
FIG. 1 is a plan view showing a bus bar connecting arrangement for a gas insulated switchgear in accordance with the present invention.
Figure 2:
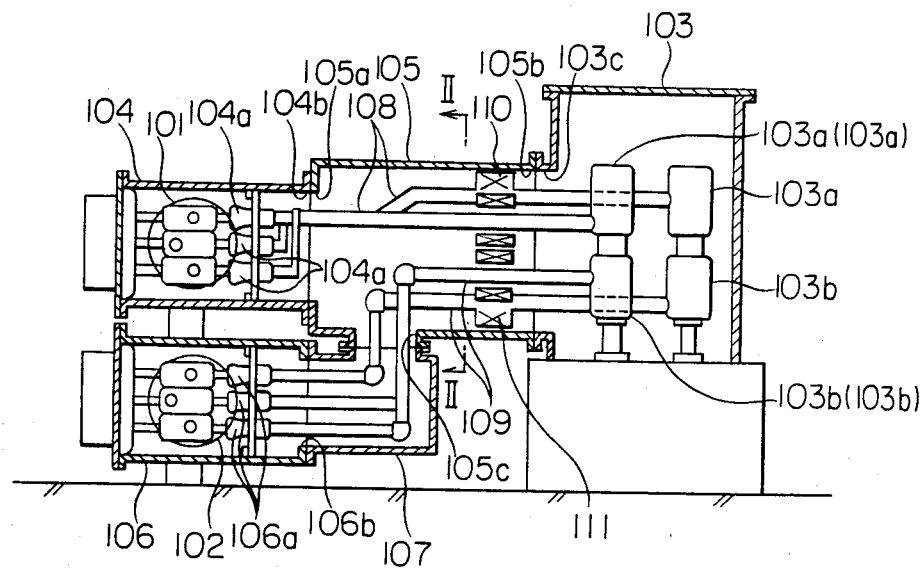
FIG. 2 is a vertical cross sectional view of FIG. 1.
Figure 3:
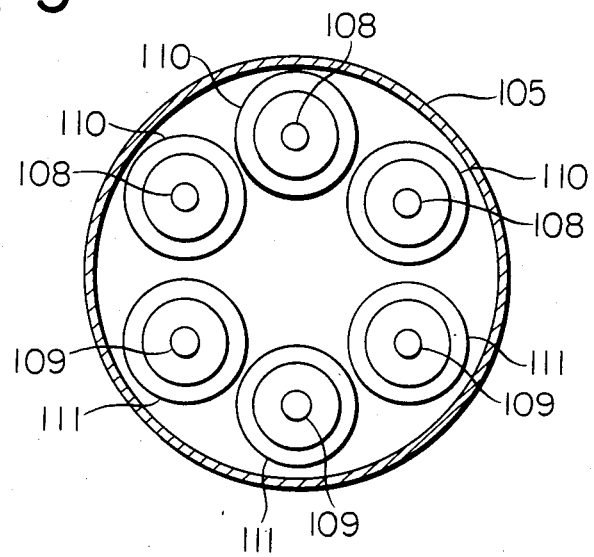
FIG. 3 is a cross sectional view taken along the line III—III in FIG. 2.

In FIGS. 1 and 2, there is shown a bus bar connecting arrangement for a gas insulated switchgear which includes a first and a second bus bar 101 and 102 vertically disposed one over the other. The first and second bus bars 101 and 102 each include a plurality (three in the illustrated embodiment) of conductors.

Connected in the first and second bus bars 101 and 102 are a first disconnecting switch unit 104 having first three disconnecting switches 104a and a second disconnecting switch unit 106 having three second disconnecting switches 106a, respectively.

The first disconnecting switch unit 104 is in the form of a T-shaped cylinder having a pair of aligned opposite ends connected with the first bus bar 101, and a central end 104b to which a current transformer unit 105 in the form of a cylinder is connected at its one end 105a perpendicularly to the first bus bar 101, the opposite end 105b of the transformer unit 105 being connected with a circuit interrupter 103 which is in the form of a vertically disposed cylinder having its opposite ends closed and an opening 103c formed through the cylindrical side wall thereof. The circuit interrupter 103 has three pairs of movable and stationary contacts 103a and 103b. The current transformer unit 105 includes a hollow cylindrical housing which has a downwardly directed opening 105c formed through the cylindrical side wall thereof.

The second disconnecting switch unit 106 is also in the form of a T-shaped cylinder having a pair of aligned opposite ends connected with the second bus bar 102, and a central end 106b which is connected through a connecting bus bar 107 in the form of a cylinder with the downwardly directed opening 105c in the transformer housing.

As clearly illustrated in FIG. 2, three first connecting conductors 108 respectively extending horizontally from the three movable contacts 103a of the circuit interrupter 103 pass through the opening 103c in the side wall of the cylindrical housing of the circuit interrupter 103, and further through a first current transformer 110 in the transformer housing 105 into the first disconnecting switch unit 104, where the first connecting conductors 108 are respectively connected with the three conductors in the first bus bar 101 through the intermediary of the first disonnecting switches 104a. On the other hand, three second connecting conductors 109 respectively extending horizontally from the three stationary contacts 103b of the circuit interrupter 103 pass through the opening 103c in the side wall of the cylindrical housing of the circuit interrupter 103, and further pass through a second current transformer 111 in the current transformer unit 105, and are then bent downwards so as to enter the housing of the connecting bus bar 107 through the lower opening 105c in the housing of the current transformer unit 105. In the connecting bus bar 107, the second connecting conductors 109 are further bent horizontally so as to extend into the second disconnecting switch unit 106, where the second conductors 109 are respectively connected with the three conductors in the second bus bar 102 through the intermediary of the second three disconnecting switches 106a.

Figure 4:
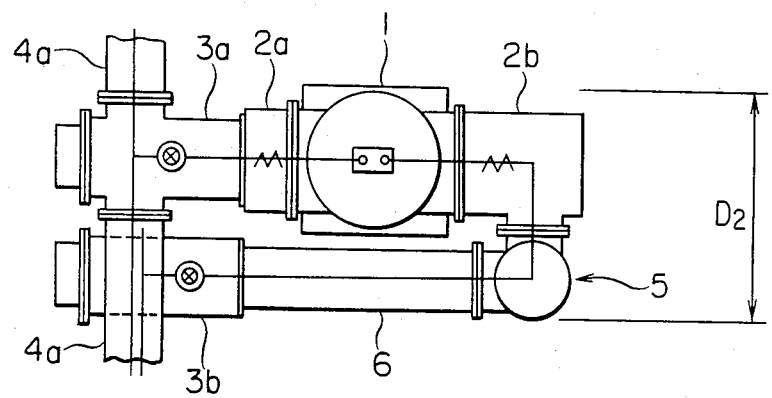
FIG. 4 is a plan view showing a conventional bus bar connecting arrangement for a gas insulated switchgear.
Figure 5:
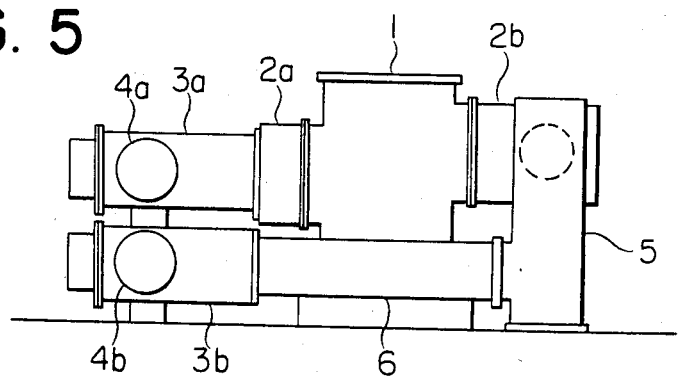
FIG. 5 is a front elevational view of FIG. 4.

In the bus bar connecting arrangement as constructed in the above manner, no turned-back arrangement as employed in the prior art shown in FIGS. 4 and 5 is required and hence the width or lateral dimension D1 of the entire bus bar connecting arrangement is equal to the width of the circuit interrupter 103 so that the required installation space is considerably reduced as compared with the conventional bus bar connecting arrangement. In addition, use of only the single connecting bus bar 107 serves to reduce the number of the component parts as required.

Further, since all of the first and second connecting conductors 108 and 109 extending from the first and second bus bars 101 and 102 are led into the circuit interrupter 103 through the single opening 103c formed in its side wall, the number of the component parts of the bus bar connecting arrangement as a whole can be further reduced, thus contributing to a trimming of the production costs as well as a reduction in the overall dimension thereof.

Although in the above-described embodiment, the first and second bus bars 101 and 102 are vertically disposed one over the other, the present invention will be likewise applicable to a case where the first and second bus bars are disposed obliquely in a horizontally and vertically spaced apart relation with each other. In this case, the housing of the current transformer unit 105 may be disposed at an appropriate angle relative to the horizontal so that the second disconnecting switch unit 106 be directly connected with the lower opening 105c in the transformer housing. Otherwise, the transformer housing may have a pair of bifurcate opening one directed upward and the other downward, to which the first and second disconnecting switch units 104 and 106 are directly connected. Such an arrangement permits the elimination of the connecting bus bar 107.

Also, the present invention will be similarly applicable to a bus bar connecting arrangement in which the first and second bus bars are horizontally disposed side by side in two rows.

Moreover, though in the embodiment illustrated, the first and second current transformers 110 and 111 are housed in the single housing 105, these transformers may be housed in two or more separate housings. Also, it is possible for only one of the current transformers 110 and 111 to be housed in the housing 105 with the remaining current transformers being omitted.

Further, it is possible to arrange a grounded barrier of an electrically conductive material or a ungrounded barrier of an electrically insulated material between the first and second connecting bus bars 108 and 109 so as to reinforce the electrical insulation therebetween.

In addition, the first and second bus bars 101 and 102 may each have one or more conductors, and in this case, the first and second disconnecting switch units 104 and 106 each have the corresponding number of first and second disconnecting switches 104a and 106a, respectively; the circuit interrupter 103 includes the corresponding number of movable and stationary contacts 103a and 103b; the current transformer unit 105 includes the corresponding number of first and second current transformers 110 and 111; and the first and second connecting conductors 108 and 109 correspond in number to the first and second bus bars 101 and 102.

What is claimed is:

1. A bus bar connecting arrangement for a gas insulated switchgear comprising a pair of first and second bus bars disposed in a spaced apart relation with each other; first and second disconnecting switch units connected to said first and second bus bars, respectively; a circuit interrupter provided with a single opening and including at least a pair of movable and stationary contacts for opening and closing an electrical circuit connecting between said first and second bus bars; a current transformer unit formed of at least a current transformer and adapted to be interposed between said first and second bus bars and said circuit interrupter; first connecting conductor means extending from said first bus bar into said circuit interrupter through said current transformer unit and said opening in said circuit interrupter for electrical connection between said first bus bar and said movable contact of said circuit interrupter; and second connecting conductor means extending from said second bus bar into said circuit interrupter through said current transformer unit and said opening in said circuit interrupter for electrical connection between said second bus bar and said stationary contact of said circuit interrupter.

2. A bus bar connecting arrangement for a gas insulated switchgear as claimed in claim 1, wherein said first and second bus bars are vertically disposed one over the other.

3. A bus bar connecting arrangement for a gas insulated switchgear as claimed in claim 1 wherein said first current transformer unit includes a hollow cylindrical housing having at least one pair of first and second current transformers received therein, said hollow cylindrical housing being directly connected at its one end with said first disconnecting switch unit and at its other end with said opening in said circuit interrupter, said hollow cylindrical housing being provided at its side wall with an opening which is connected through a connecting bus bar with said second disconnecting switch unit.

4. A bus bar connecting arrangement for a gas insulated switchgear as claimed in claim 1 wherein said and second bus bars are horizontally disposed in two rows.

5. A bus bar connecting arrangement for a gas insulated switchgear as claimed in claim 4 wherein said current transformer unit includes a Y-shaped hollow cylindrical housing which is directly connected at its bifurcate ends with said first and second disconnecting switch units, respectively, and at its other end with said opening in said circuit interrupter.

6. A bus bar connecting arrangement for a gas insulated switchgear as claimed in claim 1 wherein said first and second bus bars are obliquely disposed in a vertically and horizontally spaced apart relation with each other.

7. A bus bar connecting arrangement for a gas insulated switchgear as claimed in claim 6 wherein said current transformer unit includes a Y-shaped hollow cylindrical housing which is directly connected at its bifurcate ends with said first and second disconnecting switch units, respectively, and at its other end with said opening in said circuit interrupter.

8. A bus bar connecting arrangement for a gas insulated switchgear as claimed in claim 3 wherein said current transformer unit has a single housing in which said first and second current transformers are accommodated.

9. A bus bar connecting arrangement for a gas insulated switchgear as claimed in claim 8 wherein said transformer housing has three openings formed therethrough and is connected at one of said three openings with said first disconnecting switch unit, at another opening thereof with said second disconnecting switch unit, and at the last opening thereof with said circuit interrupter.

10. A bus bar connecting arrangement for a gas insulated switchgear as claimed in claim 3 wherein said current transformer unit includes at least two separate housings in one of which said first current transformer is housed, and in the other of which said second current transformer is housed.

11. A bus bar connecting unit for a gas insulated switchgear as claimed in claim 1 wherein said first and second bus bars each have a plurality of conductors; said first and second disconnecting switch units each have the corresponding number of first and second disconnecting switches, respectively; said circuit interrupter includes the corresponding number of movable and stationary contacts; said current transformer unit includes the corresponding number of first and second current transformers; and said first and second connecting conductor means each comprise the corresponding number of connecting conductors each electrically connecting one of said first bus bar conductors with the associated one of said second bus bar conductors.

12. A bus bar connecting unit for a gas insulated switchgear as claimed in claim 1 further comprising a barrier for providing electrical insulation between said first and second connecting conductor means.

* * * * *